Oct. 31, 1939.   H. BÜTTNER   2,177,862
APPARATUS FOR MAKING SPRING ASSEMBLIES OR SPRING FILLINGS
Filed Aug. 15, 1938   4 Sheets-Sheet 1
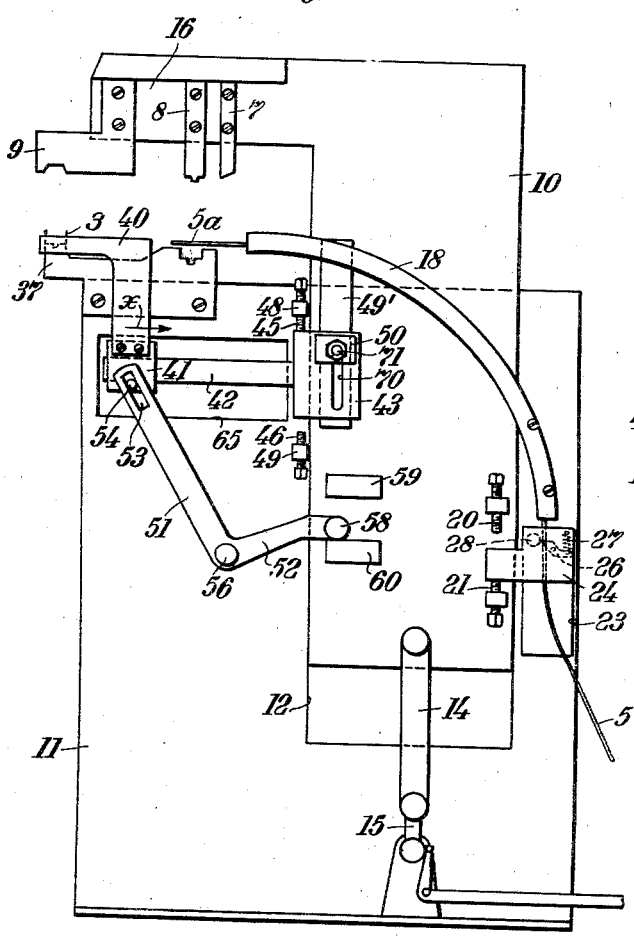
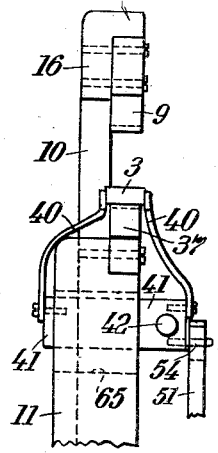
Inventor,
Hugo Büttner,
By Frank S. Appleman
Attorney Oct. 31, 1939.  H. BÜTTNER  2,177,862
APPARATUS FOR MAKING SPRING ASSEMBLIES OR SPRING FILLINGS
Filed Aug. 15, 1938   4 Sheets-Sheet 2

Inventor,
Hugo Büttner,
By Frank S. Appleman
Attorney

Oct. 31, 1939.                H. BÜTTNER                 2,177,862
APPARATUS FOR MAKING SPRING ASSEMBLIES OR SPRING FILLINGS
              Filed Aug. 15, 1938         4 Sheets-Sheet 3
Fig. 5
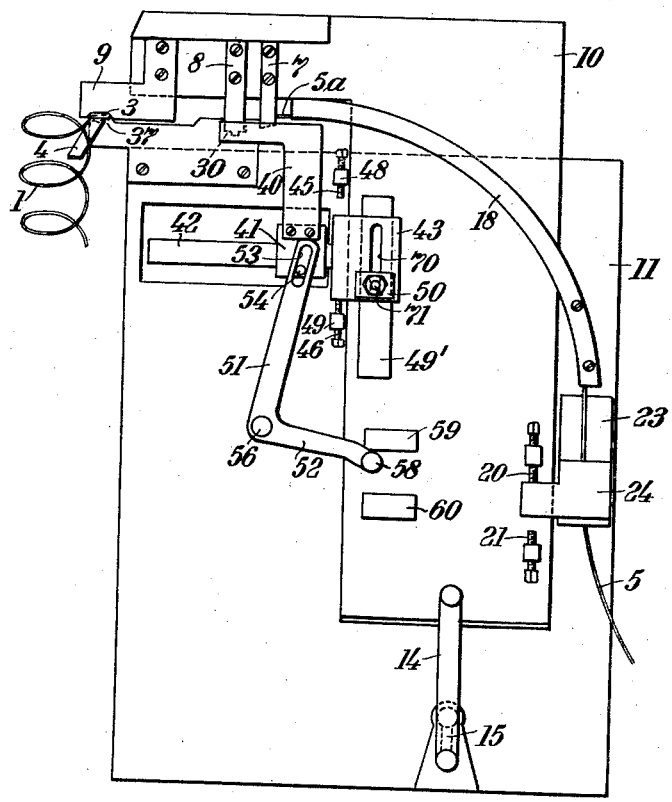
Fig. 9      Fig. 8      Fig. 7
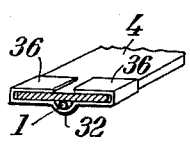 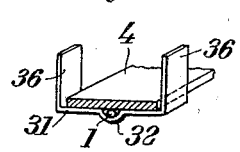 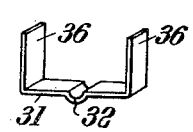
Inventor,
Hugo Büttner,
By Frank S. Appleman
Attorney Oct. 31, 1939.   H. BÜTTNER   2,177,862
APPARATUS FOR MAKING SPRING ASSEMBLIES OR SPRING FILLINGS
Filed Aug. 15, 1938   4 Sheets-Sheet 4

Inventor,
Hugo Büttner,
By Frank S. Appleman
Attorney.

Patented Oct. 31, 1939

2,177,862

UNITED STATES PATENT OFFICE 2,177,862

APPARATUS FOR MAKING SPRING ASSEMBLIES OR SPRING FILLINGS

Hugo Büttner, Wuppertal-Vohwinkel, Germany

Application August 15, 1938, Serial No. 225,028
In Germany August 17, 1937

6 Claims. (Cl. 140—11)

The present invention is concerned with methods and apparatus for making spring assemblies or spring fillings, e. g., for mattresses, seats, sofas, and so on, and more especially those assemblies or fillings in which the springs, or some of the springs are attached to a retaining frame or to each other by means of clips or similar fastenings.

In this latter type of spring assembly all the springs or the marginal or outer springs, are generally connected to the frame by means of sheet metal clips, but hitherto this attachment has been done manually, each clip being clamped around the frame by means of a suitable tool. Not only is this operation troublesome and wastes a considerable amount of time, but it is also expensive due to the specially finished and pre-shaped clips that are required.

The present invention has for an object the avoidance of these drawbacks.

An object of the invention is a method of attaching a spring to the frame of a spring assembly or spring stuffing or to another spring, comprising severing a clip blank from a metal strip, shaping said blank and folding said blank around the parts of the spring and frame or of the springs to be connected, said severing, shaping and folding operations being effected automatically in timed relation to one another.

The invention also includes a machine for attaching a spring to the frame or to another spring of a spring assembly or spring stuffing, comprising means for severing a blank from a metal strip, means for shaping said blank to form a retaining clip, and means for folding said clip around the parts to be interconnected, said severing, shaping and folding means being adapted for automatic, co-ordinated operation.

Advantageously the clip blanks are severed from an endless metal strip which is fed by a gripping device to the severing, shaping and folding means at a rate, and in an intermittent fashion, correlated to the operation of the aforesaid means.

The severing means, which may advantageously be a knife, the shaping means, which is preferably a punch co-operating with a fixed die, and the folding means are advantageously mounted on a common reciprocating carriage so as to be movable to and from the work in unison.

This carriage, according to further features of the invention, is arranged to operate the strip feeding device and a carrier for transporting the clip blank from one operating station to the other.

One embodiment of a machine according to the invention is illustrated in the drawings, in which:

Figures 1 and 2 are a plan and an elevational view respectively of a spring unit or assembly of the kind to be produced by the method and apparatus according to the present invention. In these figures, the covering of the spring unit is shown broken away to expose the spring stuffing.

Figures 3 to 6 are diagrammatic illustrations of a machine constructed according to the invention with the parts in positions corresponding to the various operating stages.

Figures 7 to 9 illustrate the manner in which a clip for attaching the springs to the frame, is dealt with by the machine of Figures 3 to 6.

Figure 10 is a front view of the upper portion of the machine illustrated in Figures 3 to 6.

Figure 4:
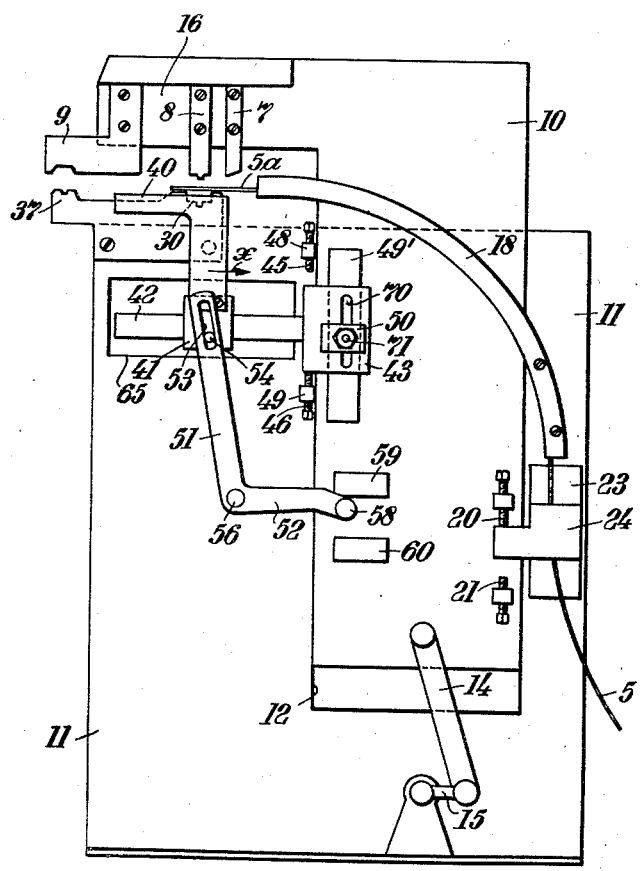

Referring first to Figures 1 and 2, the marginal springs 1 of the assembly of box springs illustrated in these figures are attached to a frame 4 by means of sheet metal clips 3, the whole assembly being enclosed in a covering 2. The machine which will be described hereafter is not only capable of clipping the springs to the frame 4, but is also arranged to cut clip blanks from an endless steel or iron strip and to preform these ready for the clamping.

The tool for cutting off the clip blanks from an endless strip 5 is a knife denoted by 7, this tool together with a punch 8 which is adapted to shape the blank and a tool 9 for turning over the ends of the clip, being mounted on a lateral arm 16 of a sliding carriage 10 which is adapted to reciprocate in a guideway 12 in the body 11 of the machine. The desired reciprocating movement is imparted to the carriage 10 from an external power source by means of a pair of pivotally connected lever arms 14 and 15. The knife 7, punch 8 and closing tool 9 are so mounted on the arm 16, e. g., each by means of a pair of screws, as to be readily replaceable, and of course participate in the reciprocating motion of this arm.

The strip 5 is drawn off a drum 5 (not shown) and is passed intermittently to the knife 7 and punch 8 by means of an arcuate guide 18 fitted to the body of the machine. The forwarding of the strip 5 is made dependent on the movement of the carriage 10 by the provision of a block 24 carrying a pick-up device for the strip 5 and movable in a guide-way 23 in the machine body 11.

The carriage 10 is provided with a pair of opposed set screws 20 and 21 which co-operate with a lateral arm on the block 24 so as to raise or lower this block in correlation with the movement of the carriage 10. The pick-up device is indicated in Figure 3, and comprises a rockable lever 26 pressed by means of a spring 27 against an abutment 28, the lever 26 only coming into operation to grip the strip 5 against abutment 28, and thus move this strip positively, when the block 24 moves in the upward direction.

The purpose of the set screws 20 and 21 is to enable the length of strip 5 forwarded at each upward movement of the carriage 10 to be regulated.

Figure 3 illustrates the carriage 10 in its uppermost position. In this position the strip 5 has been forwarded by an amount such that an end portion 5a projects out from the upper, open end of the curved guide 18, this portion 5a being intended for the formation of a clip. During the same movement of the carriage 10, a blank 3, which has been severed from the strip 5 and preformed in the preceding downward movement of the carriage 10, is moved by means of a carrier 40 to an anvil or table 37 located beneath the tool 9.

Thereupon the carriage 10 moves downwards and performs its working stroke, whereby a clip blank is cut off from the end of strip 5 by means of the knife 7 and simultaneously the punch 8 forces the blank into a die 30 located at the upper part of the machine in register with the punch 8 (see Figure 5). In this way the clip blank is given the shape illustrated in Figure 7, i. e., a U-shape or channelled shape comprising a pair of upstanding flanges 36 and an intermediate web 31 having a central groove 32 which, as is hereafter explained, is adapted to accommodate a portion of a spring convolution.

In the succeeding upward movement of the carriage 10, the preformed blank is moved, in a manner to be described hereafter, so as to lie over the anvil 37. The end portion of a spring 1 is then inserted in the groove 32 and the frame 4 is placed between the flanges 36 of the clip as illustrated in Figure 8. During the following downward movement of carriage 10, the sides of a bevelled recess or groove in the tool 9 press the arms 36 downwards and inwards so that the spring coil 1 is clamped to the frame 4 as illustrated in Figure 9.

The form of the carrier 40 which conducts the clip blank from one operating station to the other can be understood from Figure 10, this carrier comprising two resilient arms subtending the upper portion of the machine body 11 and attached at their lower ends to a slide 41. The latter is guided by a horizontal rod 42 passing through slide 41 and moves in a slot 65 in the body of the machine.

The rod 42 is secured to a member 43 which is constrained to move in a vertical direction within certain limits, in response to the movement of the carriage 10. The extent of this movement of the member 43 is regulated by set screws 45 and 46 mounted in internally threaded lugs 48 and 49 on the body 11 of the machine.

The member 43 is movable in a slot 49' in the carriage 10, being coupled to this carriage by means of a friction or brake spring 50. This spring 50 is arranged on the end of a pin 71 which projects through a slot 70 in the member 43, and bears against the front surface of this member 43.

The upward movement of the member 43 carrying rod 42 need only be of small magnitude and such that the resilient carrier 40 lifts the preformed clip 3 out of the die 30 and moves it to the anvil 37, which is arranged at a slightly higher level.

The carrier 40 is moved laterally by means of a bell crank lever 51, 52, pivoted at 56 and having in its longer arm 51 a slot 53 of restricted length, in which slot engages a pin 54 secured to the slide 41. The shorter arm 52 of the bell crank lever is operated by abutments 59 and 60 formed on or attached to the carriage 10.

As will be understood from Figure 4, when the carriage 10 moves downwardly the member 43 and thus the carrier 40 move with it. At the same time, this carrier is moved along the rod 42 to the right hand side, i. e., in the direction of arrow X, by the bell crank 51, 52. Eventually, when the carriage 10 is at the bottom of its stroke, the carrier 40 reaches the position illustrated in Figure 5.

Figure 6:
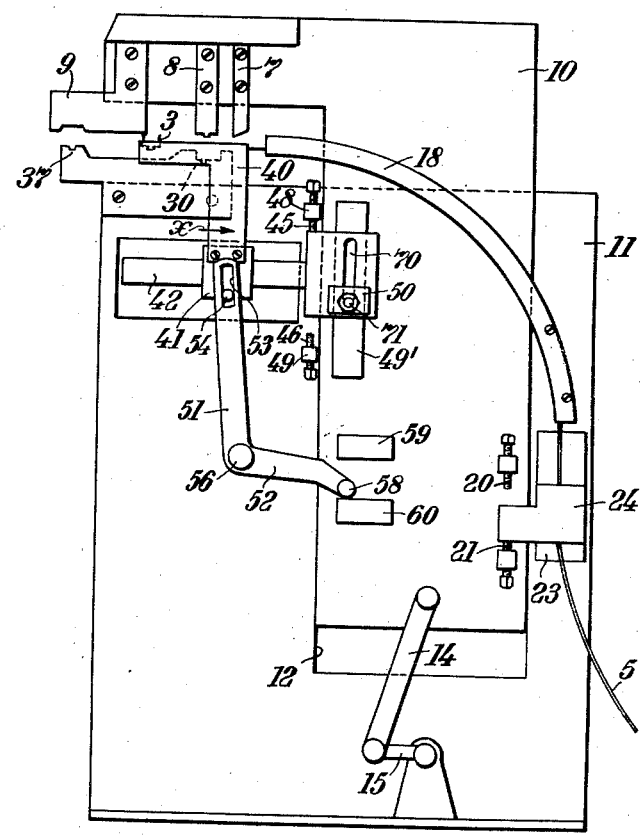

If now the carriage 10 moves upwardly (see Figure 6), the carrier 40, which in the meantime has gripped the clip blank 3, is raised and moved laterally in the direction opposite to that of arrow X. The end position of this movement is indicated in Figure 3 with the clip blank 3 placed on the anvil 37. At this instant, each of the tools 7, 8 and 9 has taken up its elevated position.

The end convolution of the spring 1 and the frame 4 are then placed in the blank, the readily-displaceable carrier 40 being pressed downwards.

Thereafter, as has previously been explained, the downward stroke of the carriage 10 causes the severance of the clip blank 3 from the end 5a of the continuous strip 5, and the pre-shaping of this blank in the die 30. At the same time, the blank which has been cut off and shaped in the preceding down stroke of the carriage 10 has its arms 36 folded over the frame 4 so as to attach the latter to the wire of a spring 3.

The invention is in no wise limited to the embodiments shown and described herein and may be varied within the scope of the claims. For example, instead of the spring being clipped to a portion of the frame, it may be clipped to another spring.

I claim:

1. A machine for attaching a spring in a spring assembly, comprising a knife for severing a clip blank from a continuous metal strip, punch and die means for shaping said clip, said knife and said punch and die member being mounted on a common reciprocating carriage and being adapted to act on the same metal strip portion simultaneously in a first operating station, folding means for clipping a preshaped blank around the parts of the spring and spring assembly to be connected in a second operating station, said folding means being mounted on said carriage, means for transporting a clip blank from the first to the second operating station, and means for actuating said transporting means in response to the stroke of said carriage in which the knife and punch and die means are inoperative.

2. A machine for attaching a spring in a spring assembly, comprising means for advancing a metal strip intermittently to the machine, a knife for severing a clip blank from the metal strip, punch and die means for providing the clip blank with a pair of upstanding arms, a reciprocable carriage on which said knife and punch and die means are mounted, clipping means for pressing down said clip arms around the parts of the spring and spring assembly to be interconnected, a carrier for transporting a shaped clip-blank from the punch and die means to said clipping means, an oscillatable slide on which said carrier is mounted, and means for transmitting the reciprocating movement of the carriage to said oscillatable slide.

3. A machine according to claim 2, wherein the slide is displaceably mounted on a bar and the means for transmitting the reciprocating movement of the carriage to the oscillatable slide comprises a bell-crank lever pivoted on a fixed part of the machine, connecting means between said bell-crank lever and said slide, and a lost motion device connecting said slide to the said carriage.

4. A machine for attaching a spring in a spring assembly, comprising means for advancing a metal strip intermittently to the machine, a knife for severing a clip blank from the metal strip, punch and die means for providing the clip blank with a pair of upstanding arms, a reciprocable carriage carrying the knife and the punch and die means, clipping means for pressing down said clip arms around the parts of the spring and spring assembly to be interconnected, a carrier for transporting a shaped clip blank from the punch and die means to said clipping means, a slide connected to said carrier and slidably mounted on a supporting bar, means for oscillating said slide along said bar in response to the movement of the reciprocable tool carriage, and means for raising and lowering said bar and slide in correlation with the movement of the reciprocable tool carriage.

5. A machine according to claim 4, wherein the means for raising and lowering the bar and slide comprise a frictional coupling connecting the bar to the reciprocable tool carriage, and wherein regulating means are provided for controlling the limits within which said bar can be moved by the carriage.

6. A machine for attaching a spring in a spring assembly, comprising means for severing a blank from an endless metal band, means adapted for movement simultaneously with said severing means for preshaping said blank, and blank folding means adapted for movement in correlation with said severing and preshaping means, said blank folding means being adapted to engage said blank around the parts of the spring and spring assembly to be connected and comprising a member having a groove with chamfered sides which is adapted to co-operate with an anvil provided on a fixed part of the machine.

HUGO BUTTNER.